(12) United States Patent
Cheng

(10) Patent No.: US 12,536,948 B2
(45) Date of Patent: Jan. 27, 2026

(54) ELECTRONIC DEVICE

(71) Applicant: Novatek Microelectronics Corp., Hsinchu (TW)

(72) Inventor: Huan-Teng Cheng, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 18/797,433

(22) Filed: Aug. 7, 2024

(65) Prior Publication Data

US 2025/0391314 A1    Dec. 25, 2025

(30) Foreign Application Priority Data

Jun. 20, 2024  (TW) .................................. 113122810

(51) Int. Cl.
*G09G 3/20* (2006.01)
*G06F 3/041* (2006.01)

(52) U.S. Cl.
CPC ....... *G09G 3/2096* (2013.01); *G06F 3/04166* (2019.05); *G09G 2330/021* (2013.01); *G09G 2340/0435* (2013.01); *G09G 2354/00* (2013.01); *G09G 2370/00* (2013.01)

(58) Field of Classification Search
CPC .......... G09G 3/2096; G09G 2330/021; G09G 2340/0435; G09G 2354/00; G09G 2370/00; G06F 3/04166
See application file for complete search history.

(56) References Cited

U.S. PATENT DOCUMENTS

| | | | |
|---|---|---|---|
| 11,893,929 B2 | 2/2024 | Yang et al. | |
| 2012/0013719 A1* | 1/2012 | Choi | H04N 13/139 348/51 |
| 2015/0243204 A1* | 8/2015 | Park | G09G 3/3688 345/212 |
| 2016/0179275 A1* | 6/2016 | Lee | G06F 3/04166 345/174 |
| 2018/0040301 A1* | 2/2018 | Bae | G09G 5/363 |
| 2020/0082760 A1* | 3/2020 | Ogata | G09G 3/3258 |
| 2022/0351679 A1 | 11/2022 | Yang et al. | |

FOREIGN PATENT DOCUMENTS

CN   111968582   11/2020
TW   I635478    9/2018

OTHER PUBLICATIONS

"Office Action of Taiwan Counterpart Application", issued on May 7, 2025, p. 1-p. 5.

* cited by examiner

Primary Examiner — Towfiq Elahi
(74) Attorney, Agent, or Firm — JCIPRNET

(57) ABSTRACT

Disclosed is an electronic device, including a display panel, a driving circuit, and a processor circuit. The display panel is configured to display an image. The driving circuit is configured to drive the display panel to display the image based on an image data. The processor circuit is configured to output the image data to the driving circuit. The driving circuit outputs a request signal to the processor circuit to request the processor circuit to output the image data. The driving circuit adjusts a frame rate of the image based on the image data.

15 Claims, 7 Drawing Sheets

ELECTRONIC DEVICE

CROSS-REFERENCE TO RELATED APPLICATION

This application claims the priority benefit of Taiwan application serial no. 113122810, filed on Jun. 20, 2024. The entirety of the above-mentioned patent application is hereby incorporated by reference herein and made a part of this specification.

BACKGROUND

Technical Field

The disclosure relates to an electronic device, and in particular relates to a display device.

Description of Related Art

With the development of display technology, display panels have been widely applied in various electronic devices. For a handheld electronic device, an image data is mainly transmitted by an application processor to a display driving chip to display an image on the display panel. However, the display panel continuously updating the image not only tends to consume power, but also decreases a use time of the handheld electronic device.

SUMMARY

The disclosure provides an electronic device whose frame rate of an image may be gradually adjusted to avoid the frame rate of the image being directly adjusted from an initial frame rate to a target frame rate, thereby generating an excessive frame rate difference that affects the display quality.

The electronic device in the embodiment of the disclosure includes a display panel, a driving circuit, and a processor circuit. The display panel is configured to display the image. The driving circuit is configured to drive the display panel to display the image based on an image data. The processor circuit is configured to output the image data to the driving circuit. The driving circuit outputs a request signal to the processor circuit to request the processor circuit to output the image data. The driving circuit adjusts the frame rate of the image based on the image data.

In order to make the features and advantages of the disclosure more comprehensible, the following examples are given and described in detail with the accompanying drawings as follows.

DESCRIPTION OF THE EMBODIMENTS

Figure 1:
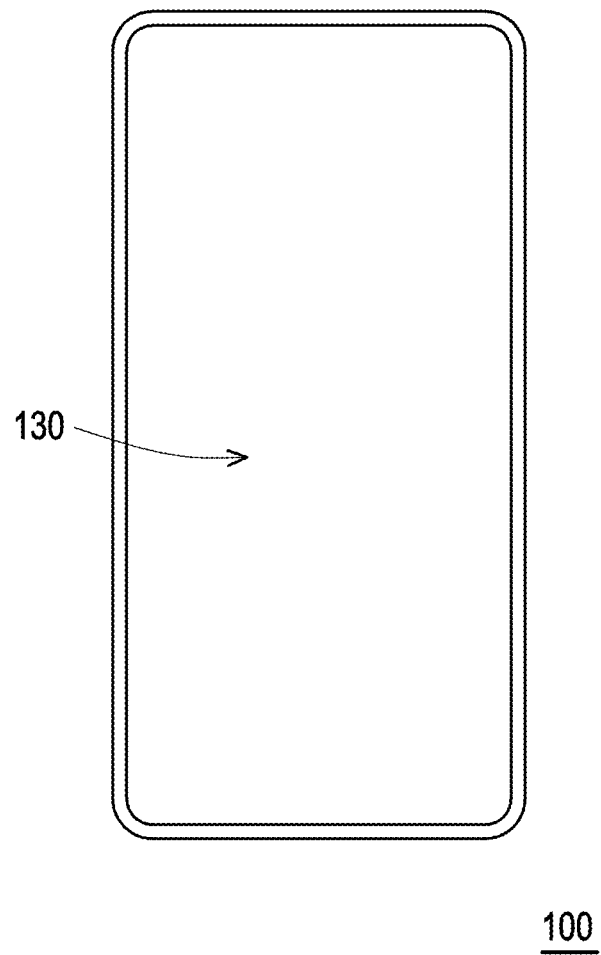
FIG. 1 shows a schematic outline diagram of an electronic device according to an embodiment of the disclosure.

The term "coupled (or connected)" used in this specification (including claims) may refer to any direct or indirect connection means. For example, "a first device is coupled (connected) to a second device" should be interpreted as "the first device is directly connected to the second device" or "the first device is indirectly connected to the second device through other devices or connection means". The terms "first" and "second" mentioned in the full text of the specification of the disclosure (including claims) are used to name elements or to distinguish different embodiments or scopes, neither to be used to limit upper or decrease limit of the number of elements nor limit the sequence of the elements. In addition, wherever possible, elements/elements/steps with the same reference numbers are used in the drawings and embodiments to represent the same or similar parts. Elements/elements/steps using the same numbers or using the same terms in different embodiments may serve as cross-reference for each other.

Figure 2:
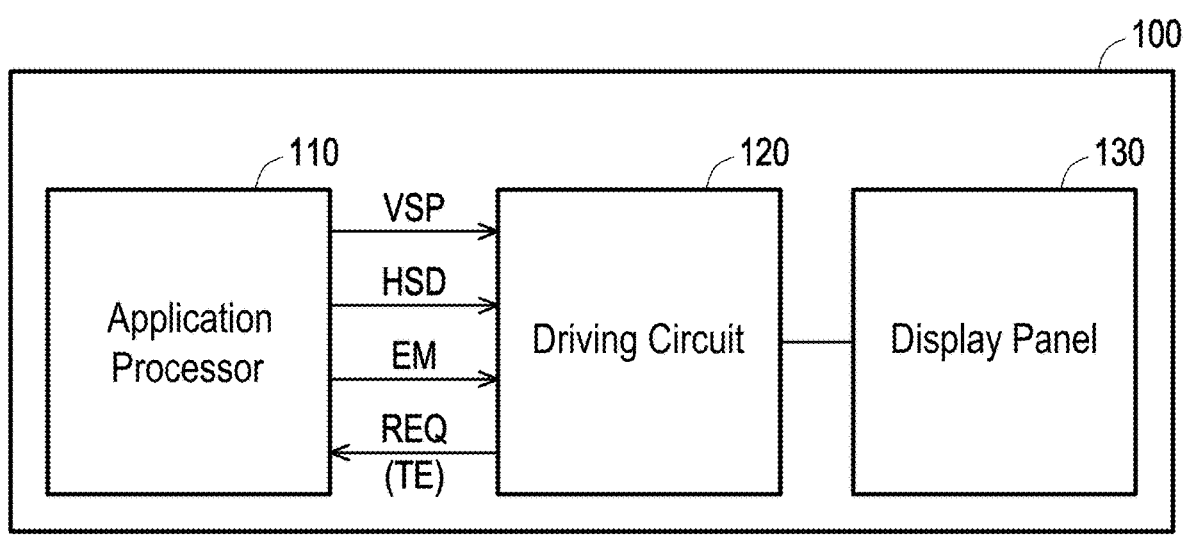
FIG. 2 shows a schematic block diagram of the electronic device according to the embodiment of FIG. 1.
Figure 3:
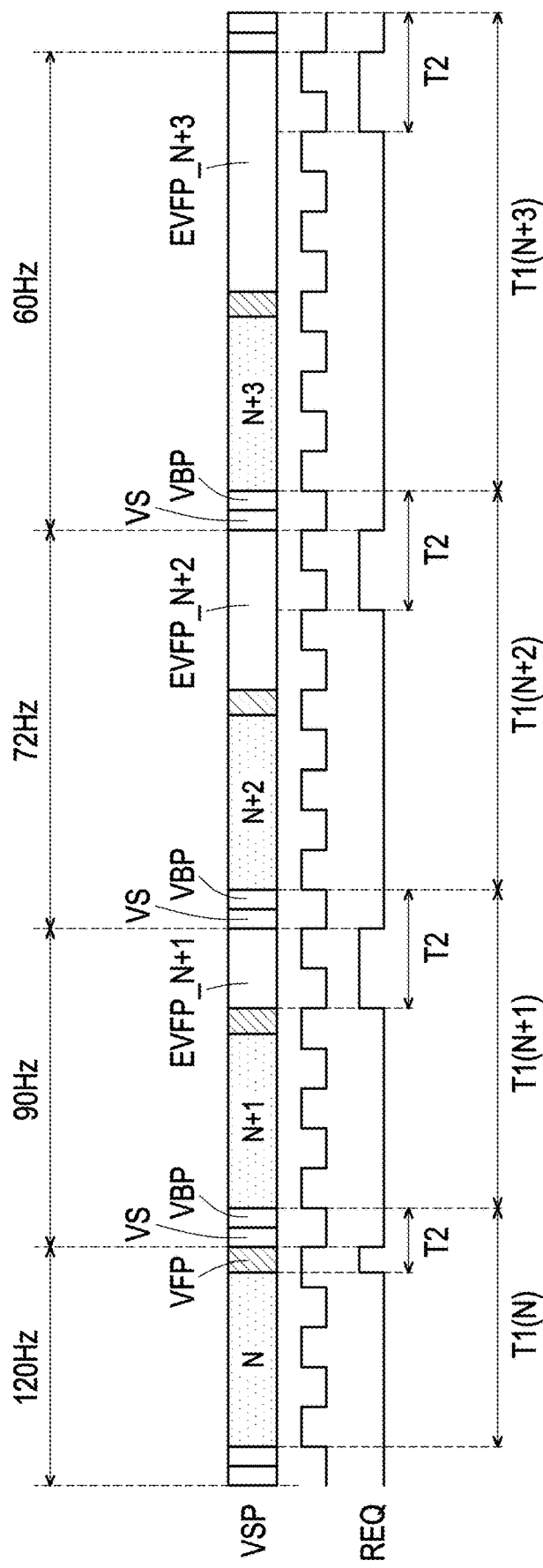
FIG. 3 shows a schematic diagram of waveforms of each operation signal according to the embodiment of FIG. 2.

FIG. 1 shows a schematic outline diagram of an electronic device according to an embodiment of the disclosure. FIG. 2 shows a schematic block diagram of the electronic device according to the embodiment of FIG. 1. FIG. 3 shows a schematic diagram of waveforms of each operation signal according to the embodiment of FIG. 2. Please refer to FIG. 1, FIG. 2, and FIG. 3. An electronic device 100 includes an application processor 110, a driving circuit 120, and a display panel 130. The application processor 110 is coupled to the driving circuit 120. The driving circuit 120 is coupled to the display panel 130. In the embodiment, the application processor 110 is used as an example of a processor circuit. However, in different types of electronic devices, the processor circuit may be other hardware elements with processor functions.

In the embodiment, the application processor 110 is configured to output a vertical synchronization signal VSP, an image data HSD, and a scan signal EM to the driving circuit 120. The driving circuit 120 may drive the display panel 130 to display an image based on the vertical synchronization signal VSP, the image data HSD, and the scan signal EM. In addition, the driving circuit 120 may also output a request signal REQ to the application processor 110, and actively requests the application processor 110 to output the image data HSD. Then, the driving circuit 120 adjusts a frame rate of the image based on the image data HSD.

In the electronic device 100, the application processor 110 and the driving circuit 120 may perform signal transmission through a mobile industry processor interface (MIPI). Transmission modes may be mainly divided into a command mode and a video mode.

In the command mode, the driving circuit 120 as a display chip or a touch display chip may output a tearing effect signal TE to the application processor 110 through a pin. The application processor 110 determines whether to output the image data to the driving circuit 120 based on a signal level. Therefore, in the command mode, a time when each frame of the data starts to be transmitted may be controlled by the tearing signal TE. In the video mode, the application processor 110 may continue to output the image data to the driving circuit 120, whether the tearing signal TE is received or not.

In the embodiment, the driving circuit 120 may use the original tearing effect signal TE as the request signal REQ. Whether in the command mode or in the video mode, the driving circuit 120 may notify the application processor 110 to output the image data through the request signal REQ to control the time when each frame of the data starts to be transmitted.

Alternatively, in another embodiment, the driving circuit 120 may also be additionally provided with a pin. In the video mode, the driving circuit 120 transmits the request signal REQ to the application processor 110 through the pin additionally disposed to notify an output of the image data. In the command mode, the driving circuit 120 may use an original pin to transmit the tearing effect signal TE to the application processor 110 to notify the output of the image data.

In an embodiment, the display panel 130 is, for example, an adaptive refresh panel (ARP) that is capable of reserving images for a long time. The electronic device 100 with the ARP may operate in a variable refresh rate (VRR) mode to achieve an effect of saving power. For example, the driving circuit 120 may control a frame rate of an image based on the image data HSD. In FIG. 3, an initial frame rate of the image is 120 Hz, and a target frame rate is 60 Hz. The frame rate of the image may start to gradually decrease from 120 Hz, 90 Hz, 72 Hz to 60 Hz. In this way, the frame rate of the image being directly decreased from the initial frame rate 120 Hz to the target frame rate 60 Hz and affecting the display quality may be avoided. In another embodiment, the target frame rate of the image may be decreased to a minimum of 1 Hz. The disclosure does not limit the frame rate of the image.

In addition, in FIG. 3, a period of vertical front porch (VFP) between frames may be extended to gradually decrease the frame rate of the image. Specifically, T1 represents a time length of each frame, and T2 represents a time interval between each active frame. For example, the time interval T2 of Frame N corresponds to the period of vertical front porch VFP, a period of vertical synchronization VS, and a period of vertical back porch VBP. In a frame period T1(N) of Frame N, the frame rate of the image is 120 Hz, and the request signal REQ of a high level corresponds to the period of vertical front porch VFP. The driving circuit 120 outputs the request signal REQ of the high level in the time interval T2 to request the application processor 110 to prepare to transmit an image data of Frame N+1.

Then, in a frame period T1(N+1) of Frame N+1, the frame rate of the image is 90 Hz, and the request signal REQ of the high level corresponds to an extended period of vertical front porch EVFP_N+1. The driving circuit 120 outputs the request signal REQ of the high level in the time interval T2 to request the application processor 110 to prepare to transmit an image data of Frame N+2. The time interval T2 of Frame N+1 corresponds to the period of vertical front porch EVFP_N+1, the period of vertical synchronization VS, and the period of vertical back porch VBP.

Similarly, in a frame period T1(N+2) of Frame N+2 or in a frame period T1(N+3) of Frame N+3, the driving circuit 120 outputs the request signal REQ of the high level in the time interval T2 to request the application processor 110 to prepare to transmit the image data, and so on. In the frame period T1(N+2) of Frame N+2 and in the frame period T1(N+3) of Frame N+3, the time length of the extended period of vertical front porch EVFP_N+2 or the time length of the extended period of vertical front porch EVFP_N+3 is substantially equal to an integer multiple of a cycle of a scan signal EM, such as twice or three times respectively in the example. The time length of the request signal REQ of the high level is substantially equal to one cycle of the scan signal EM.

Therefore, in a VRR mode, the driving circuit 120 may actively request the application processor 110 to transmit an image data of a next frame through the request signal REQ during the extended period of vertical front porch to gradually decrease the frame rate of the image, thereby optimizing the display effect and achieving an object of saving power.

In the embodiment, the electronic device 100 may be an electronic device with a display function and a touch sensing function. In another embodiment, the electronic device 100 may be, but not limited to, a smart phone, a non-smart phone, a wearable electronic device, a tablet computer, a personal digital assistant, a notebook, and other portable electronic devices that may operate independently and have the display function, the touch sensing function, and a fingerprint sensing function. In another embodiment, the electronic device 100 may be, but not limited to, a portable or non-portable electronic device in a vehicle intelligence system. In another embodiment, the electronic device 100 may be, but not limited to, an intelligent home appliance, such as a television, a computer, a refrigerator, a washing machine, a telephone, an induction cooker, a table lamp, etc.

In the embodiment, the application processor 110 is a processor with computing capabilities. As another option, the application processor 110 may be designed through a hardware description language (HDL) or any other digital circuit design method familiar to those skilled in the art, and may be a hardware circuit implemented through a field programmable gate array (FPGA), a complex programmable logic device (CPLD), or an application-specific integrated circuit (ASIC). In addition, enough teaching, suggestion, and implementation illustration for hardware structures of the appliance processor 110 may be obtained with reference to common knowledge in the related art.

In the embodiment, the driving circuit 120 may be a touch and display driver integrated circuit (TDDI) without random access memory (RAMless) that may drive the display panel 130 to execute the display function and the touch sensing function, but the disclosure is not limited thereto. When the driving circuit 120 is implemented as a single chip integrated circuit that may drive and control the display panel 130 to execute display operations and touch sensing operations, the display panel 130 may include a control circuit, and the control circuit 130 may be a micro-controller based core to execute all control activities of display operations and touch sensing operations. The control circuit may include at least one of a timing controller, a touch controller, a digital circuit, and other controllers or processors of a display driving circuit.

In the embodiment, the display panel 130 may be a self-luminous display panel, such as an organic light-emitting diode (OLED) display panel. In other embodiments, the display panel 130 may also be a display panel including micro light-emitting diodes (micro LED) or sub-millimeter light-emitting diodes (mini LED). The display panel 130 may also be a non-self-luminous display panel, such as a liquid crystal display panel. The disclosure does not limit the type of the display panel.

Figure 4:
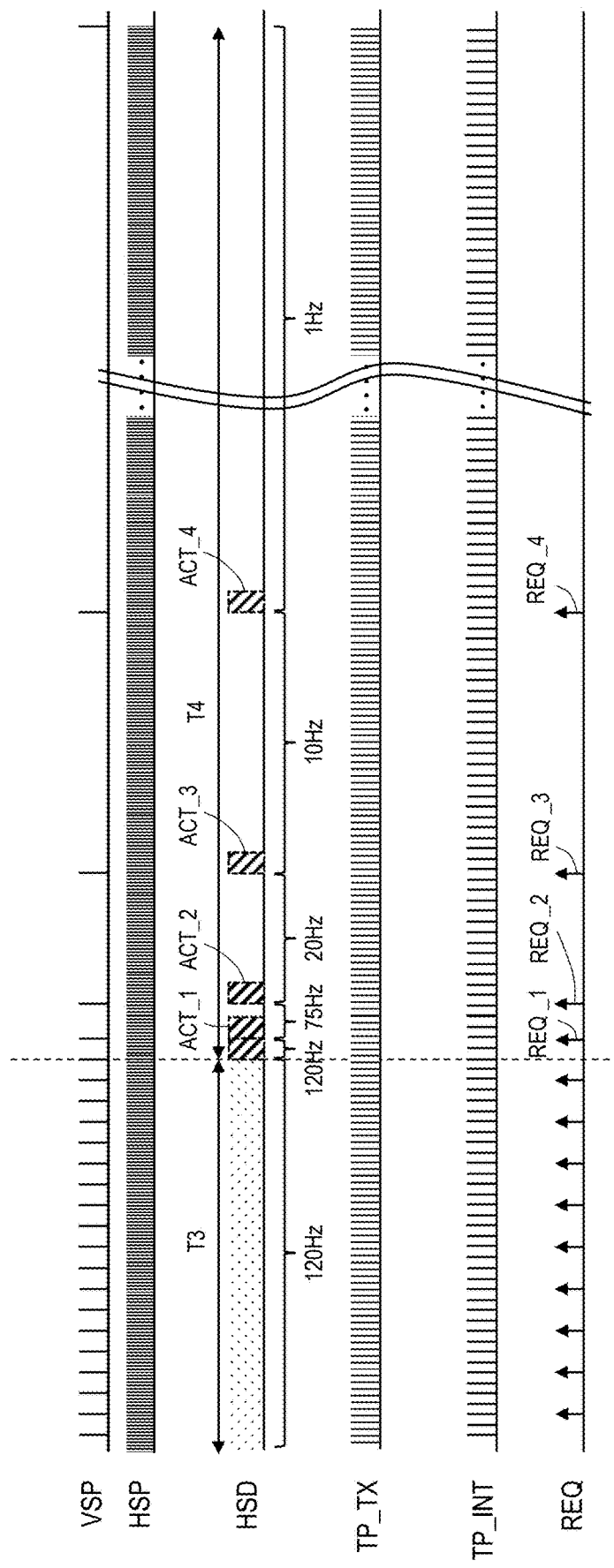
FIG. 4 shows a schematic diagram of waveforms of each operation signal according to another embodiment of the disclosure.

FIG. 4 shows a schematic diagram of waveforms of each operation signal according to another embodiment of the disclosure. Please refer to FIG. 2 and FIG. 4. In FIG. 4, VSP is a vertical synchronization signal output by the application processor 110 to the driving circuit 120, HSP is a horizontal synchronization signal output by the application processor 110 to the driving circuit 120, and HSD is a horizontal synchronization data (an image data) output by the application processor 110 to the driving circuit 120. The application processor 110 may output the foregoing signals to the driving circuit 120 through a mobile industry processor interface (MIPI), but the disclosure does not limit the type of a signal transmission interface.

In the embodiment, during a period T3, the application processor 110 continues to output the image data HSD to the driving circuit 120 to update an image content, and a frame rate of an image is retained at 120 Hz.

Then, in a period T4, the image data HSD includes multiple active frames ACT_1, ACT_2, ACT_3, and ACT_4. The driving circuit 120 may gradually decrease the frame rate of the image from 120 Hz to 1 Hz based on the active frames ACT_1, ACT_2, ACT_3, and ACT_4. The active frames ACT_1, ACT_2, ACT_3, and ACT_4 include information of the image content to be displayed. Therefore, the driving circuit 120 may first output request signals REQ_1, REQ_2, REQ_3, and REQ_4 to the application processor 110 to request the application processor 110 to transmit the image data HSD. The driving circuit 120 further gradually decreases the frame rate of the image from 120 Hz to 1 Hz based on the image data HSD transmitted by the application processor 110 as a basis for frequency reduction.

Specifically, in the period T4, the driving circuit 120 outputs the request signal REQ_1 to the application processor 110, and the application processor 110 accordingly outputs the active frame ACT_1 to the driving circuit 120. The driving circuit 120 further decreases the frame rate of the image from 120 Hz to 75 Hz based on the active frame ACT_1. Then, the driving circuit 120 outputs the request signal REQ_2 to the application processor 110, and the application processor 110 accordingly outputs the active frame ACT_2 to the driving circuit 120. The driving circuit 120 further decreases the frame rate of the image from 75 Hz to 20 Hz based on the active frame ACT_2. Similarly, the driving circuit 120 sequentially outputs the request signals REQ_3 and REQ_4 to the application processor 110, and further gradually decreases the frame rate of the image from 20 Hz, 10 Hz to 1 Hz based on the active frames ACT_3 and ACT_4 output by the application processor 110. Therefore, in the embodiment, the driving circuit 120 may sequentially decrease the frame rate of the image from 120 Hz, 75 Hz, 20 Hz, 10 Hz to 1 Hz based on the active frames ACT_1, ACT_2, ACT_3, and ACT_4. In this way, the frame rate of the image being directly decreased from the initial frame rate 120 Hz to the target frame rate 1 Hz and affecting the display quality may be avoided.

In addition, during the period T4, the image content of the image data (that is, the active frames ACT_1, ACT_2, ACT_3, and ACT_4) may be the same and not updated. Therefore, the application processor 110 may enter a sleep state to further achieve the effect of saving power.

On the other hand, TP_TX is a driving signal configured for the driving circuit 120 to drive the display panel 130 to execute the touch sensing function. TP_INT is a stop signal configured for the driving circuit 120 to stop the display panel 130 from executing the touch sensing function, and the display panel 130 reports a touch sensing result to the driving circuit 120 at this time. In the embodiment, a report rate of touch sensing is, for example, retained at 240 Hz, but the disclosure is not limited thereto. In addition, in order to maintain normal reporting, the driving circuit 120 avoid a report time when transmitting the request signals REQ_1, REQ_2, REQ_3, and REQ_4.

Figure 5:
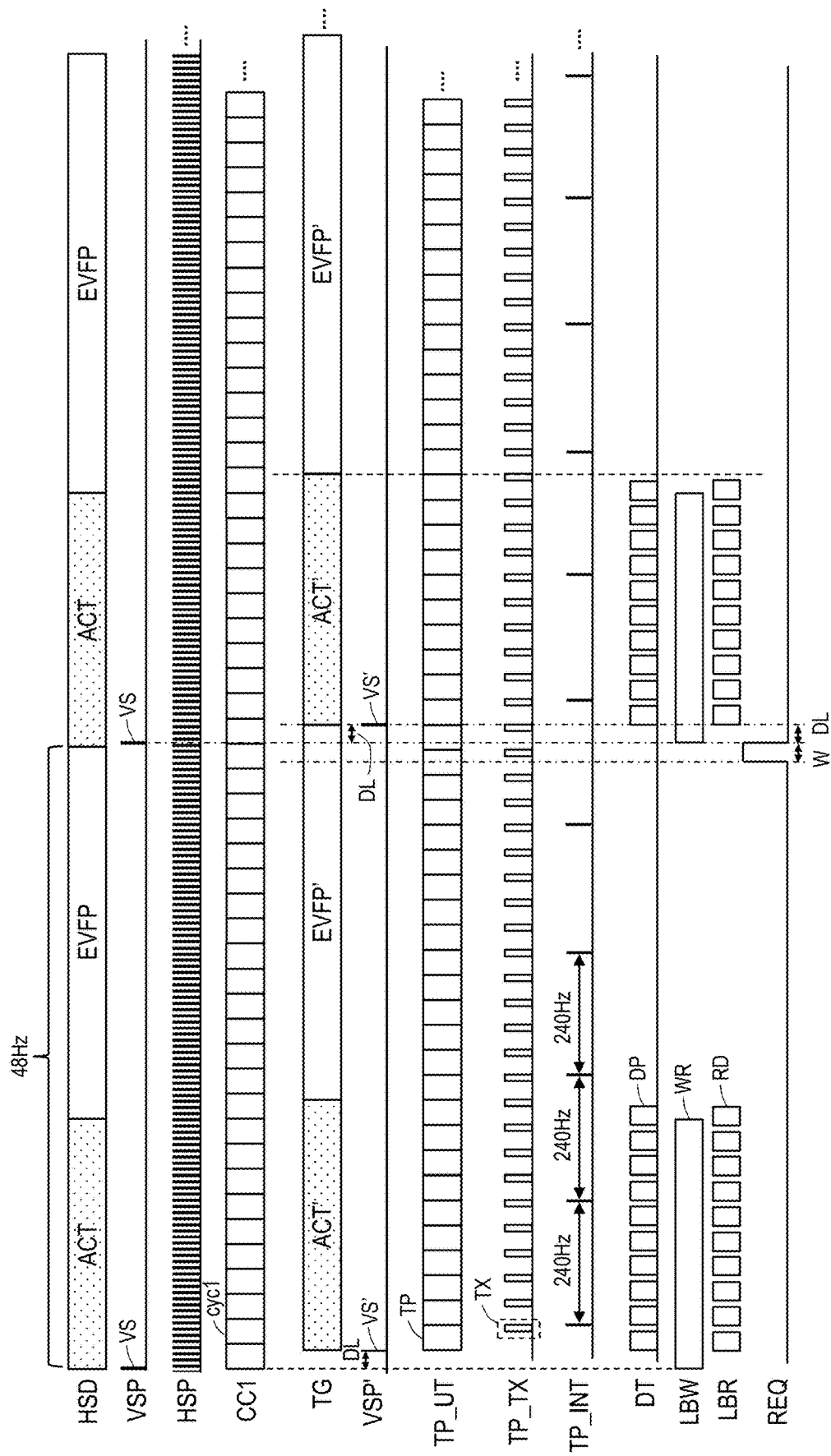
FIG. 5 shows a schematic diagram of waveforms of each operation signal according to another embodiment of the disclosure.

FIG. 5 shows a schematic diagram of waveforms of each operation signal according to another embodiment of the disclosure. Please refer to FIG. 5. The embodiment of FIG. 5 is configured to illustrate how to determine a send timing and a width of the request signal REQ. The driving circuit 120 of the embodiment uses, for example, a long horizontal scan timing (long H timing) mechanism to drive the display panel 130 to execute a display function and a touch sensing function.

Specifically, a touch time signal TP_UT represents that the display panel 130 may be substantially divided into multiple touch units (such as 10), and TP represents a time for each touch unit to perform touch sensing (hereinafter referred to as a touch time unit TP). That is to say, the driving circuit 120 drives at least one touch unit of the display panel 130 to perform the touch sensing operation in the touch time unit TP. The touch unit includes one or multiple touch sensing electrodes or touch sensors. When the multiple touch units complete the touch sensing operation, the driving circuit 120 has performed a complete scan of the display panel 130. The signal TP_INTA indicates that a report rate of touch sensing of the embodiment is retained at 240 Hz.

In addition, a signal DT includes multiple display terms DP. Between each two of the display terms DP, which may be referred to as a touch term, the driving circuit 120 outputs a signal TX during the touch term to drive the display panel 130 to perform the touch sensing operation.

On the other hand, a signal LBW represents that the application processor 110 may continuously write data to a line buffer of the driving circuit 120 during a write term WR. The write term WR corresponds to an active frame ACT period of the image data HSD. In a signal LBR, after a read term RD of a display data is read from the line buffer, the display panel 130 may start to perform touch sensing. In a touch and display driver integrated circuit without random access memory, a capacity of the line buffer is usually not enough to store one entire frame of an image data. Therefore, as shown in the signal DT, a display time of one entire frame of the image data may be dispersed in the multiple display terms DP, and the touch sensing operation may be executed after each of the display terms DP.

Then, in the vertical synchronization signal VSP (a first vertical synchronization signal), every two pulse waves VS define a frame period, and a frame rate is 48 Hz. Each frame period includes the active frame ACT period and an extended period of vertical front porch EVFP, and is marked in the horizontal synchronization data HSP. The driving circuit 120 may internally generate a vertical synchronization signal VSP' (a second vertical synchronization signal) and a timing generate signal TG based on the vertical synchronization signal VSP and the image data HSD. The vertical synchronization signal VSP' and the timing generate signal TG are used as an internal timing reference of the driving circuit 120 to synchronously operate with the application processor 110.

In addition, since the application processor 110 must first write data to the line buffer, and then the driving circuit 120 reads data from the line buffer, in order for the driving circuit 120 to smoothly read data from the line buffer without timing disorder, the vertical synchronization signal VSP' has a time delay DL compared to the vertical synchronization signal VSP. The time delay DL may be a write time or a read time of one or more line buffers.

Correspondingly, the driving circuit 120 may determine the timing of a falling edge of the request signal REQ by a time length of a previous time delay DL based on a pulse wave VS' of the vertical synchronization signal VSP'. Then, the driving circuit 120 further determines a width W of the request signal REQ based on a wake-up time of the application processor 110. In this way, the driving circuit 120 may determine the send timing and the width W of the request signal REQ.

In the embodiment, the application processor 110 may output the image data HSD to the driving circuit 120 with a preset time unit cyc1. For example, in order to achieve high-precision frequency adjustment, after the application processor 110 receives the request signal REQ, a time length of the touch time unit TP is used as the time unit cyc1, and the vertical synchronization signal VSP and the image data HSD are output to the driving circuit 120, as shown in a time unit signal CC1. The time length (that is, a width) of the time unit cyc1 is equal to the time length of the touch time unit TP. That is to say, the active frame ACT period and the extended period of vertical front porch EVFP are both positive integer multiples of the time unit cyc1, and the pulse wave VS of the vertical synchronization signal VSP substantially corresponds to a junction of two of the adjacent time units cyc1.

Therefore, the driving circuit 120 may determine the send timing and the width W of the request signal REQ in the above manner, and output the request signal REQ to the application processor 110 during the extended period of vertical front porch EVFP'. Then, the application processor 110 uses the touch time unit TP as the time unit cyc1 to transmit the image data of a next frame to gradually decrease the frame rate of the image, thereby optimizing the display effect and achieving the object of saving power.

Figure 6:
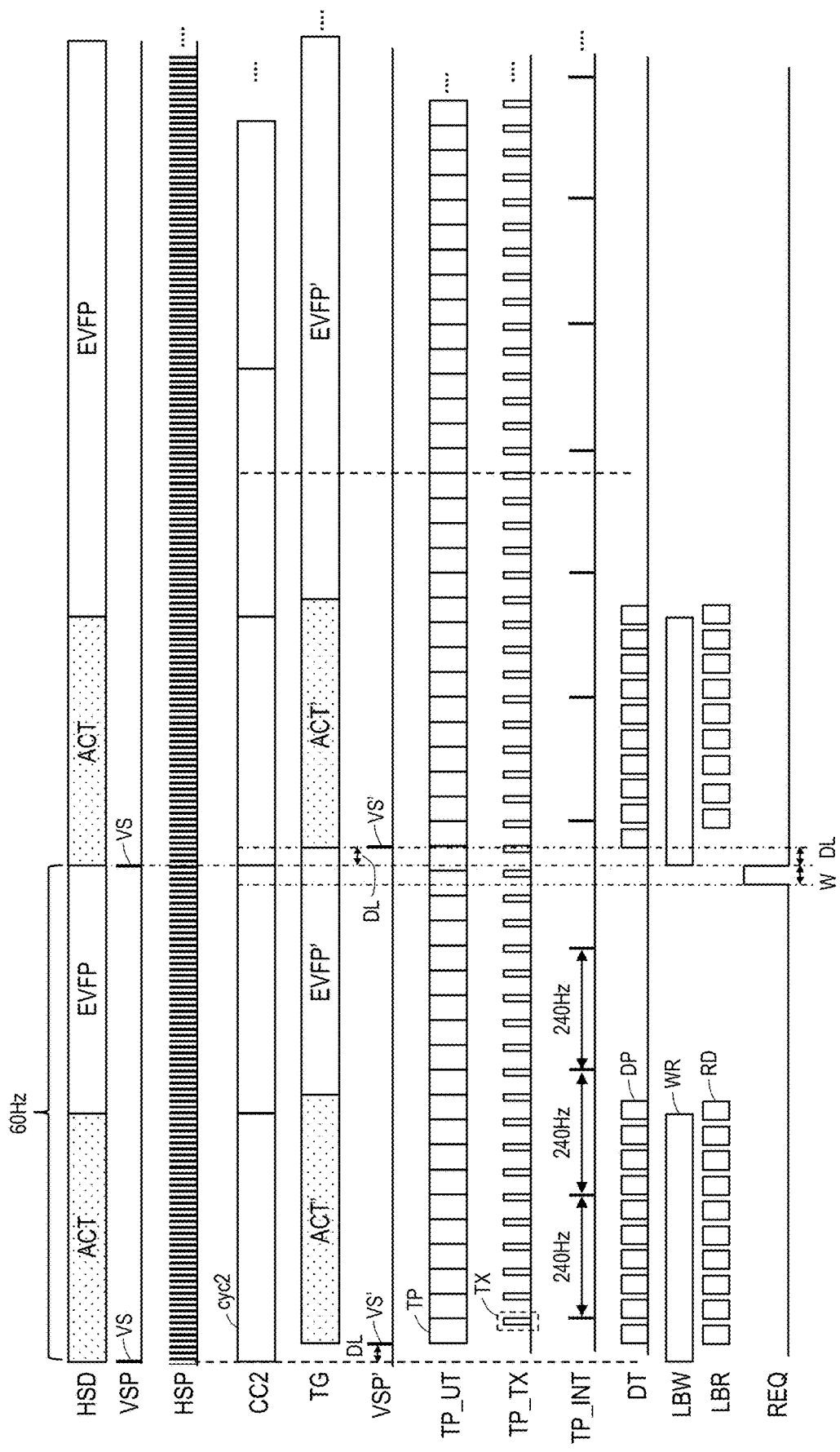
FIG. 6 shows a schematic diagram of waveforms of each operation signal according to another embodiment of the disclosure.

FIG. 6 shows a schematic diagram of waveforms of each operation signal according to another embodiment of the disclosure. Please refer to FIG. 6. In the embodiment, a frame rate of an image is 60 Hz. After the application processor 110 receives the request signal REQ, a time length of the active frame ACT may be used as a time unit cyc2 to output the vertical synchronization signal VSP and the image data HSD to the driving circuit 120, as shown in a time unit signal CC2. A time length (that is, a width) of the time unit cyc2 is equal to the time length of the active frame ACT. That is to say, an active frame ACT period and an extended period of vertical front porch EVFP are both positive integer multiples of the time unit cyc2, and the pulse wave VS of the vertical synchronization signal VSP substantially corresponds to a junction of two of the time units cyc2.

As shown in FIG. 5 and FIG. 6, the duration of the extended period of the vertical front porch EVFP can be determined by the request signal REQ, and the frame rate of the image is adjusted accordingly. The frame period includes the duration of the active frame ACT and the duration of the vertical front porch EVFP, and the frame rate can be adjusted by the duration of vertical front porch EVFP. In one embodiment, the driving circuit 120 can actively adjust the frame rate of the image on the display panel 130 by requesting the request signal REQ, and during the period of the vertical front porch EVFP, the application processor 110 can be in the standby or low-power mode.

Figure 7:
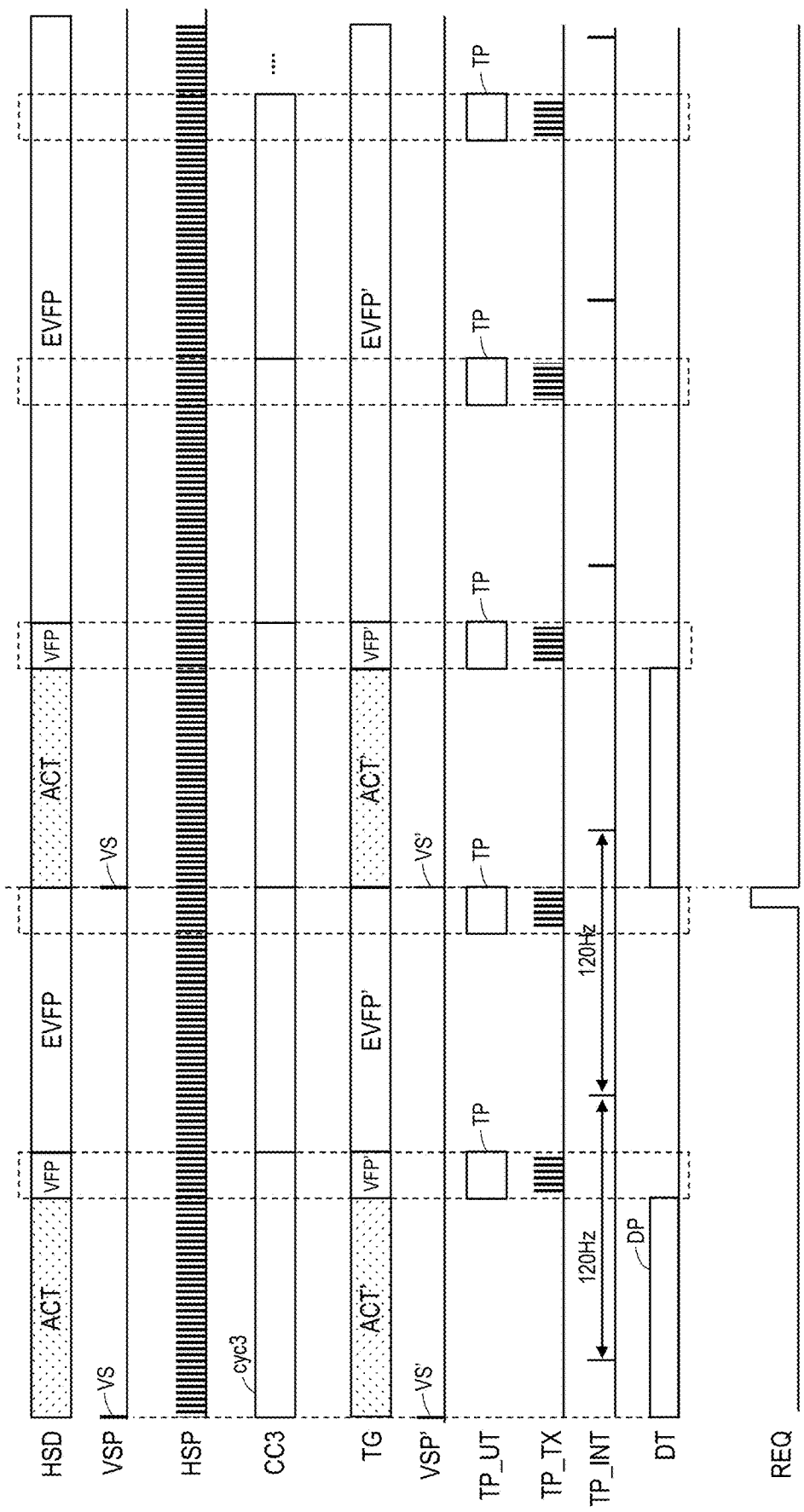
FIG. 7 shows a schematic diagram of waveforms of each operation signal according to another embodiment of the disclosure.

FIG. 7 shows a schematic diagram of waveforms of each operation signal according to another embodiment of the disclosure. Please refer to FIG. 7. The driving circuit 120 of the embodiment, for example, uses a long vertical scan timing (long V timing) mechanism to drive the display panel 130 to execute a display function and a touch sensing function. After a complete display term DP, the driving circuit 120 may further perform a one-time scan to the display panel 130. The stop signal TP_INT marks that a report rate of touch sensing of the embodiment is retained at 120 Hz.

On the other hand, in the embodiment, after the application processor 110 receives the request signal REQ, a sum of time lengths of the active frame ACT and the vertical front porch period VFP may be used as a time unit cyc3 to output the vertical synchronization signal VSP and the image data HSD to the driving circuit 120, as shown in a time unit signal CC3. A time length (that is, a width) of the time unit cyc3 is equal to the sum of time lengths of the active frame ACT and the vertical front porch period VFP. That is to say, a sum of the active frame ACT and the vertical front porch period VFP is a positive integer multiple of the time unit cyc3. The extended period of vertical front porch EVFP is a positive integer multiple of the time unit cyc3. The pulse wave VS of the vertical synchronization signal VSP substantially corresponds to a junction of two of the time units cyc3.

In addition, the driving circuit 120 may determine a timing of a falling edge of the request signal REQ based on the pulse wave VS' of the vertical synchronization signal VSP'. In the example, the timing of the falling edge is equal to the pulse wave VS' of the vertical synchronization signal VSP'. Then, the driving circuit 120 further determines the width W of the request signal REQ based on a wake-up time of the application processor 110. In this way, the driving circuit 120 may determine the send timing and the width W of the request signal REQ.

In summary, in the embodiment of the disclosure, frame rate control is mainly dominated by the driving circuit. The driving circuit outputs the request signal to the processor circuit, and then the processor circuit further outputs the image data to the driving circuit in the preset time unit. In this way, gradually decreasing the frame rate of the image by the driving circuit may not only save power, but also avoid the frame rate of the image being directly decreased from the initial frame rate to the target frame rate, thereby generating an excessive frame rate difference that affects the display quality. In addition, in order to maintain normal reporting, the driving circuit may avoid the report time when transmitting the request signal without affecting the touch sensing operation.

Although the disclosure has been disclosed in the above embodiments, the embodiments are not intended to limit the disclosure. Persons skilled in the art may make some changes and modifications without departing from the spirit and scope of the disclosure. Therefore, the protection scope of the disclosure shall be defined by the appended claims.

What is claimed is:
1. An electronic device, comprising:
a display panel, configured to display an image;
a driving circuit, configured to drive the display panel to display the image based on an image data; and
a processor circuit, configured to output the image data to the driving circuit and output a first vertical synchronization signal to the driving circuit,
wherein the driving circuit outputs a request signal to the processor circuit to request the processor circuit to output the image data, and the driving circuit adjusts a frame rate of the image based on the image data,
wherein the driving circuit generates a second vertical synchronization signal having a time delay compared to the first vertical synchronization signal, and determines a timing of a signal edge of the request signal based on a pulse wave of the second vertical synchronization signal and the time delay, wherein the driving circuit determines a width of the request signal based on a wake-up time of the processor circuit.

2. The electronic device according to claim 1, wherein the image data comprises a plurality of active frames, and the driving circuit decreases the frame rate of the image based on the plurality of active frames.

3. The electronic device according to claim 2, wherein the driving circuit sequentially decreases the frame rate of the image from a first frame rate, a second frame rate to a third frame rate based on the plurality of active frames, wherein the second frame rate is lower than the first frame rate, and the third frame rate is lower than the second frame rate.

4. The electronic device according to claim 3, wherein an image content of the plurality of active frames are the same.

5. The electronic device according to claim 4, wherein the processor circuit enters a sleep state.

6. The electronic device according to claim 1, wherein the processor circuit outputs the image data to the driving circuit in a preset time unit.

7. The electronic device according to claim 6, wherein the processor circuit uses a time length of a touch time unit as the time unit to output the image data to the driving circuit.

8. The electronic device according to claim 7, wherein the driving circuit drives at least one touch unit of the display panel to perform a touch sensing operation in the touch time unit.

9. The electronic device according to claim 6, wherein the processor circuit uses a time length of an active frame as the time unit to output the image data to the driving circuit.

10. The electronic device according to claim 9, wherein the image data comprises the active frame, and the active frame comprises information of an image content.

11. The electronic device according to claim 6, wherein the processor circuit uses a sum of time lengths of an active frame and a vertical front porch period as the time unit to output the image data to the driving circuit.

12. The electronic device according to claim 6, wherein a pulse wave of the first vertical synchronization signal corresponds to a junction of two of the adjacent time units in a time sequence.

13. An electronic device, comprising:
  a processor circuit to generate a first vertical synchronization signal and output an image data when receiving a request signal; and
  a driving circuit to drive a display panel to display a first image corresponding to the image data and generate the request signal based on the first vertical synchronization signal, wherein the driving circuit adjusts a frame rate of the first image based on the image data,
  wherein the driving circuit generates a second vertical synchronization signal having a time delay compared to the first vertical synchronization signal, and determines a timing of a signal edge of the request signal based on a pulse wave of the second vertical synchronization signal and the time delay,
  wherein the driving circuit determines a width of the request signal based on a wake-up time of the processor circuit.

14. The electronic device according to claim 13, wherein when the processor circuit and the driving circuit operate in a command mode, the processor circuit outputs a second image when receiving a tearing effect signal from the driving circuit.

15. The electronic device according to claim 13, wherein a frame period comprises an active period corresponding to the image data and a duration of a porch time, and the duration of the porch time is adjusted by the request signal.

* * * * *